April 24, 1945.  R. R. SAMPSELL  2,374,383
COMBINATION TRAILER
Filed May 18, 1944
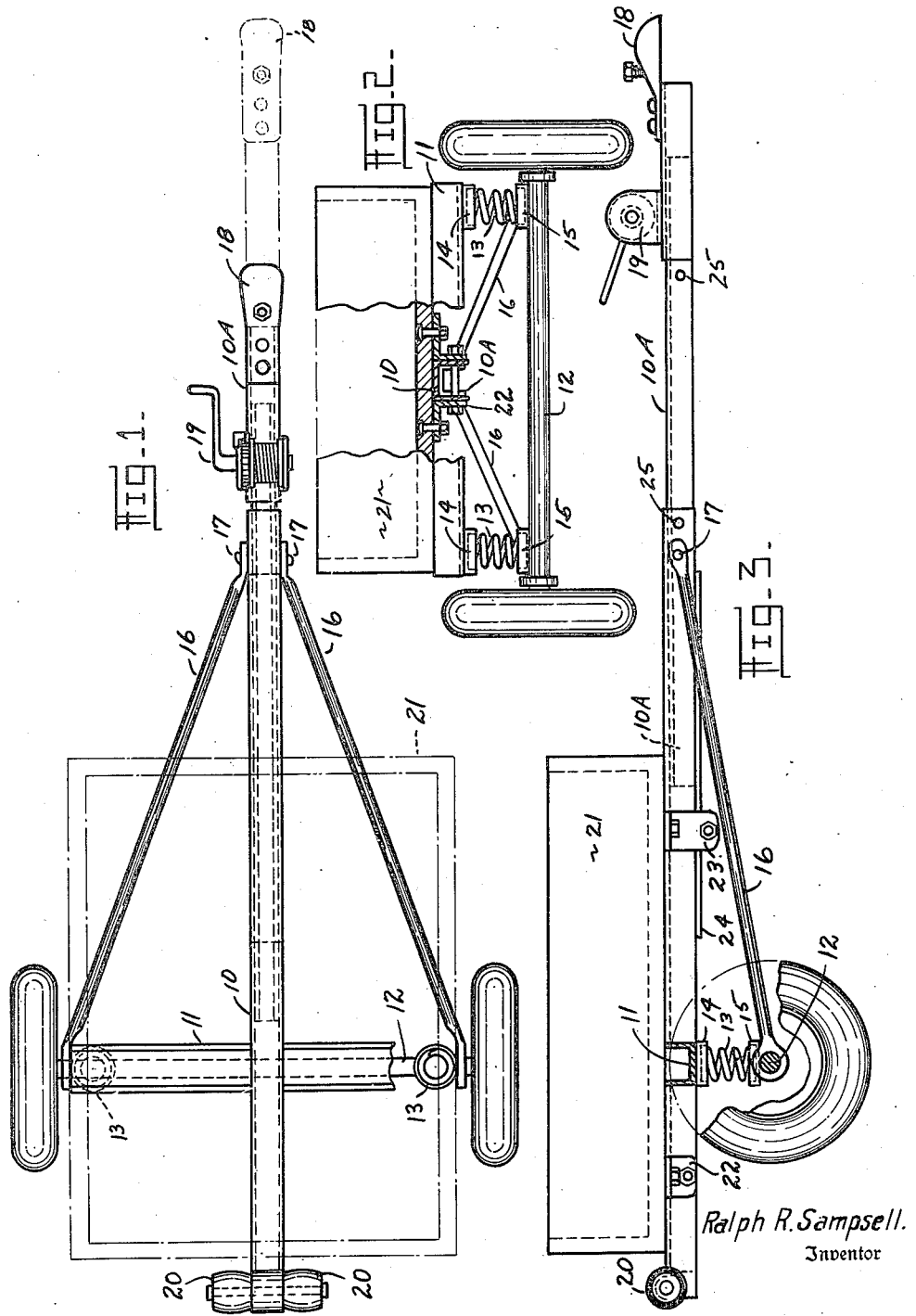
Ralph R. Sampsell.
Inventor
By W. B. Harpman
Attorney Patented Apr. 24, 1945

2,374,383

UNITED STATES PATENT OFFICE 2,374,383

COMBINATION TRAILER

Ralph R. Sampsell, Youngstown, Ohio

Application May 18, 1944, Serial No. 536,152

2 Claims. (Cl. 214—85)

This invention relates to a combination trailer and more particularly to a trailer adapted for use in either hauling a boat or a material holding box.

The principal object of the invention is the provision of a trailer adapted for use in hauling a boat and convertible to a general purpose trailer by the placement thereon of a suitable body.

A further object of the invention is the provision of a boat carrying trailer incorporating means for loading a boat thereon.

A still further object of the invention is the provision of a boat carrying trailer adjustable with respect to the length of the boat to be carried and including means for loading and unloading a boat.

The combination trailer shown and described herein has been designed to provide an all purpose trailer primarily adapted for boat transportation and for this purpose is adjustable as to length to correspond with various sizes of boats hauled. The trailer is formed with a T-shaped frame and employs an axle carrying a pair of ground engaging wheels, the axle being sprung in relation with the T-shaped frame. A portion of the longitudinal section of the T-shaped frame is telescopically positioned with respect to the remainder to facilitate the extension or retraction thereof with respect to the remainder to accommodate various lengths of boats. The trailer is also adapted for general hauling by the provision therewith of a suitable body demountable with respect thereto.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a top plan view of the combination trailer.

Figure 2 is a rear elevation of the combination trailer with parts broken away and parts in cross section.

Figure 3 is a side elevation of the combination trailer.

By referring to the drawing and Figures 1 and 3 in particular it will be seen that the combination trailer consists of a T-shaped frame formed of a primary longitudinally positioned member 10 and a transversely positioned member 11. The frame members 10 and 11 are preferably channel structures and may obviously be employed with the channel arms downwardly, as illustrated, or upwardly if desired. The longitudinally positioned frame member 10 is formed in two parts, the secondary portion thereof being indicated by the numeral 10A, it being telescopically positioned with respect to the frame member 10 so as to be adjustable as to length with respect thereto. In Figure 1 of the drawing it is shown in retracted position in which position it would be employed in hauling the box-like body of the combination trailer or in hauling a very short boat. In Figure 3 of the drawing the secondary longitudinal frame member 10 is shown in extended position as it would be employed in hauling a conventionally sized outboard motor boat. The transversely positioned frame member 11 is attached to the frame member 10 at its point of crossing and an axle 12 is positioned immediately therebeneath and sprung in relation thereto by means of a pair of coil springs 13 which are carried in suitable spring mounting brackets 14 and 15 mounted on the frame member 11 and the axle 12, respectively. (See Figure 2.) The axle 12 is held in transverse position beneath the frame member 11 by means of a pair of torque rods 16, the rearmost ends of which are shaped to encircle the axle 12 and the forward ends of which are pivotally affixed to the forward end of the primary frame member 10 by means of pivots 17 which are so formed as to provide clearance in the primary channel frame member 10 for the extensible secondary frame member 10A.

Still referring to Figures 1 and 3 of the drawing, it will be observed that a conventional tow car coupling device 18 is affixed at the forward end of the extensible frame member 10A and that immediately in back of the coupling member 18 there is a winch 19 which is employed in connection with a pair of rollers 20 positioned at the rearmost end of the frame member 10 in loading and unloading a boat. It will be obvious that when a boat is carried upon the trailer, the box-like body, indicated by the numeral 21 in Figure 3 and outlined in broken lines in Figure 1, is demounted and a suitably shaped crosspiece or cradle is positioned on the transverse frame member 11 to support the boat. In loading a boat upon the combination trailer, the trailer frame is up-ended so as to position the rollers beneath the boat's keel and a cable on the winch 19 is attached to the boat and the boat drawn forcibly up onto the trailer over the rollers 20 by means of the winch 19. The winch and cable also serve to hold the boat in position on the trailer during transport.

When the trailer is utilized as a general purpose trailer and the body 21 is, therefore, necessary, it is mounted upon the T-shaped frame by means of brackets 22 and 23 which are positioned alongside the frame member 10, in pairs, to permit bolts or other fastening means to be positioned therebetween so as to firmly hold the box or body 21 on the trailer frame.

In Figure 2 the method of mounting the box or body 21 is more clearly illustrated as the end portions of the frame and body have been broken away to disclose the construction. It will be observed by referring to Figure 3 that the forwardly positioned brackets 23 depend below the bottom of the channel-like frame member 10 in which the extensible frame member 10 is telescopically positioned so as not to interfere with its travel therein. In this connection it will be observed that a retaining plate or bottom member 24 is affixed to the channel-like frame member 10 when it is used in inverted position so as to retain the extensible frame member 10A in position therein. A plurality of openings 25 are provided in both the frame member 10 and the extensible frame member 10A so that it can be secured in either retracted or extended position as desired. In addition thereto the extensible and retractable portion of the primary frame enables the trailer to be shaped to fit the specific boat to be hauled thereby enabling a more satisfactory transporting of the boat.

It will thus be seen that a simple and highly efficient combination trailer has been disclosed which results in a minimum of unsprung weight and which is adaptable for hauling various sizes of boats and for general purpose hauling by the addition thereto of a suitable body.

Having thus described my invention, what I claim is:

1. In a trailer adapted to carry a boat or a box-like body, a frame including a pair of longitudinal members one of which is slidably positioned with respect to the other so as to be extensible therefrom, a crosspiece frame member and a pair of rollers affixed to one of the said longitudinal members, a coupler and winch affixed to the other one of the said longitudinal frame members and an axle positioned beneath and spaced from the said crosspiece frame member by means of springs.

2. In a trailer adapted to carry a boat or a box-like body, a frame including a pair of longitudinal members one of which is slidably positioned with respect to the other so as to be extensible therefrom, a crosspiece frame member and a pair of rollers affixed to one of the said longitudinal members, a coupler and winch affixed to the other one of the said longitudinal frame members and an axle positioned beneath and spaced from the said crosspiece frame member by means of springs, and torque rods attached to the said axle and the said frame.

RALPH R. SAMPSELL.